United States Patent
Yoneda

(10) Patent No.: US 8,174,764 B2
(45) Date of Patent: May 8, 2012

(54) POLARIZING GLASS AND OPTICAL ISOLATOR

(75) Inventor: Yoshitaka Yoneda, Tokyo (JP)

(73) Assignee: Hoya Candeo Optronics Corporation, Toda-shi (JP)

( * ) Notice: Subject to any disclaimer, the term of this patent is extended or adjusted under 35 U.S.C. 154(b) by 0 days.

(21) Appl. No.: 13/087,728

(22) Filed: Apr. 15, 2011

(65) Prior Publication Data

US 2011/0255161 A1    Oct. 20, 2011

Related U.S. Application Data

(63) Continuation of application No. PCT/JP2009/067938, filed on Oct. 16, 2009.

(30) Foreign Application Priority Data

Oct. 16, 2008   (JP) .................................. 2008-267994

(51) Int. Cl.
    *G02B 5/30*    (2006.01)

(52) U.S. Cl. ..................................... 359/484.03; 501/53

(58) Field of Classification Search ........................ None
    See application file for complete search history.

(56) References Cited

U.S. PATENT DOCUMENTS

| | | | | |
|---|---|---|---|---|
| 3,954,485 A * | 5/1976 | Seward et al. | ................... | 501/13 |
| 4,108,674 A * | 8/1978 | Gliemeroth | ..................... | 501/13 |
| 5,517,356 A | 5/1996 | Araujo et al. | | |
| 6,777,359 B2 | 8/2004 | Yamashita et al. | | |
| 6,777,539 B2 | 8/2004 | Sprecher et al. | | |
| 7,534,734 B2 * | 5/2009 | Ellison | ............................ | 501/66 |
| 7,696,113 B2 * | 4/2010 | Ellison | ............................ | 501/66 |
| 2009/0237787 A1 | 9/2009 | Yoneda et al. | | |
| 2010/0284074 A1 | 11/2010 | Yoneda et al. | | |

FOREIGN PATENT DOCUMENTS

| | | |
|---|---|---|
| JP | 05-208844 | 8/1993 |
| JP | 07-097235 | 4/1995 |
| JP | 08-050205 | 2/1996 |
| WO | WO 2007/119794 | 10/2007 |

OTHER PUBLICATIONS

U.S. Appl. No. 13/017,426, filed Jan. 31, 2011, Yoneda, et al.

* cited by examiner

*Primary Examiner* — Derek S Chapel

(74) *Attorney, Agent, or Firm* — Oblon, Spivak, McClelland, Maier & Neustadt, L.L.P.

(57) ABSTRACT

The near-field extinction ratio of a polarizing glass is increased. A polarizing glass contains anisotropically shaped metal particles oriented and dispersed in a glass substrate, which contains 0.40-0.85 wt % Cl relative to the entire glass substrate. The Vickers hardness ranges from 360 to 420, the Knoop hardness number ranges from 400 to 495, or the glass substrate contains at least one component selected from the group consisting of $Y_2O_3$, $La_2O_3$, $V_2O_3$, $Ta_2O_3$, $WO_3$, and $Nb_2O_5$. The content of each of the selected components ranges from 0.05-4 mole percent, and if a plurality of the components are selected, the total content of the components is 6 mole percent or less.

9 Claims, 6 Drawing Sheets

[FIG.1]
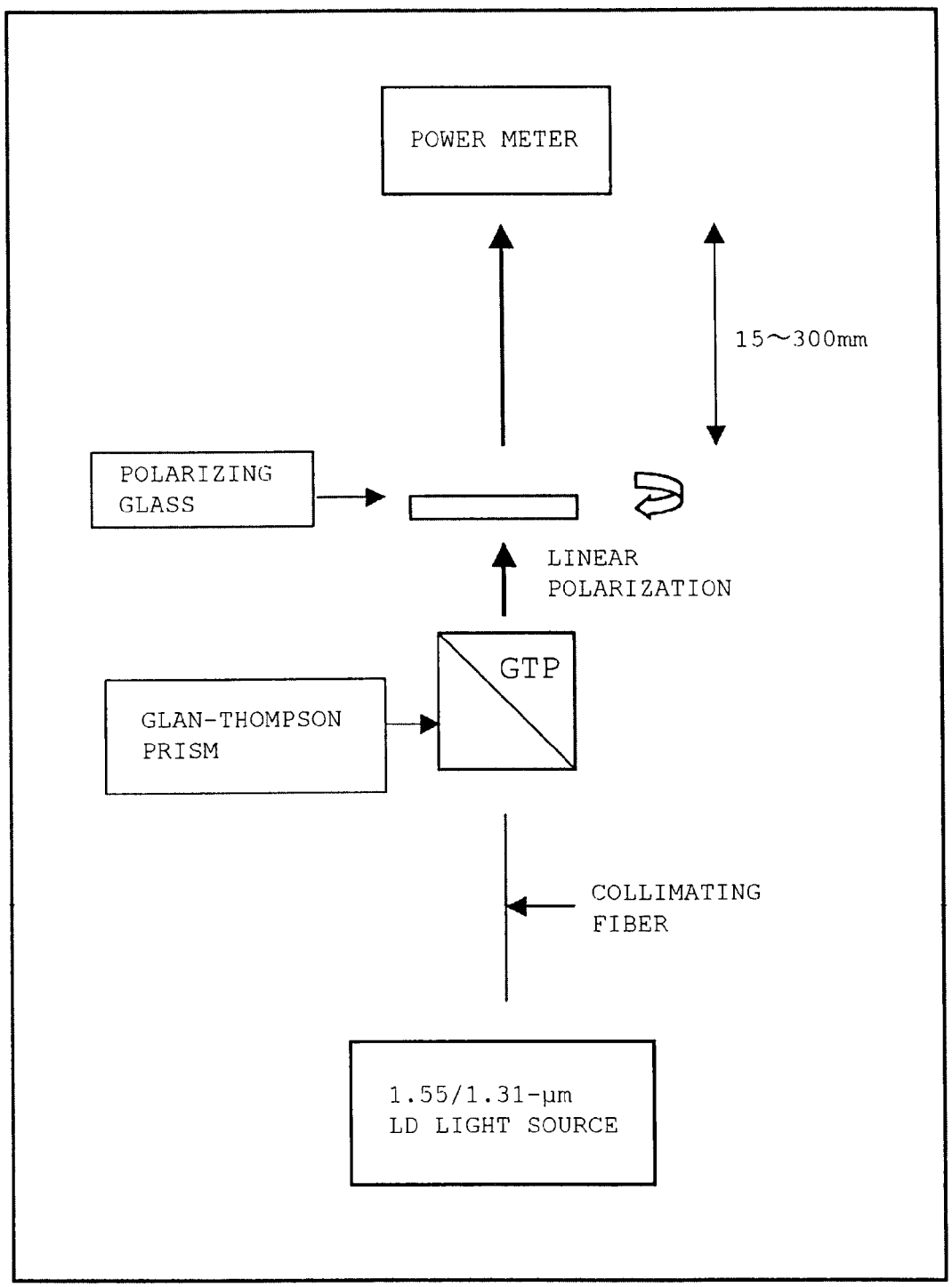

[FIG.2]
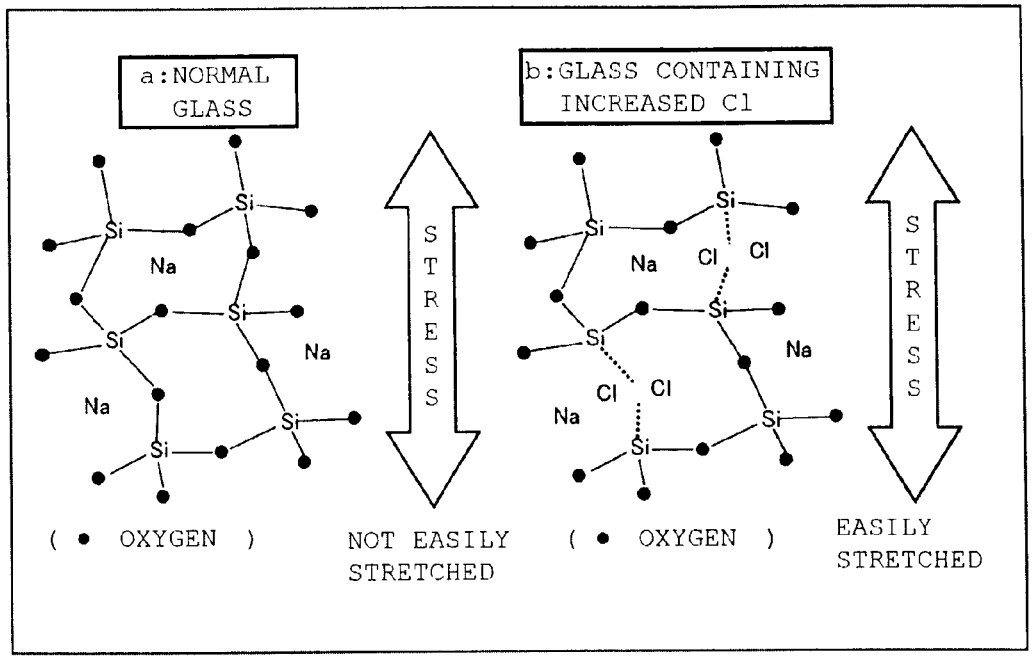
[FIG.3]
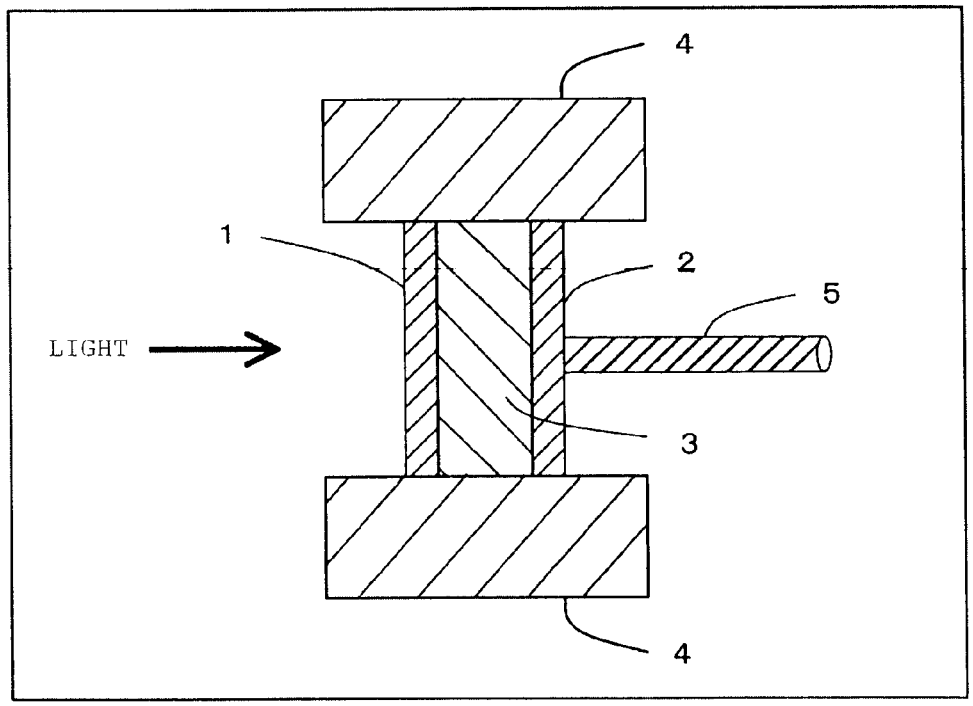

[FIG.4]
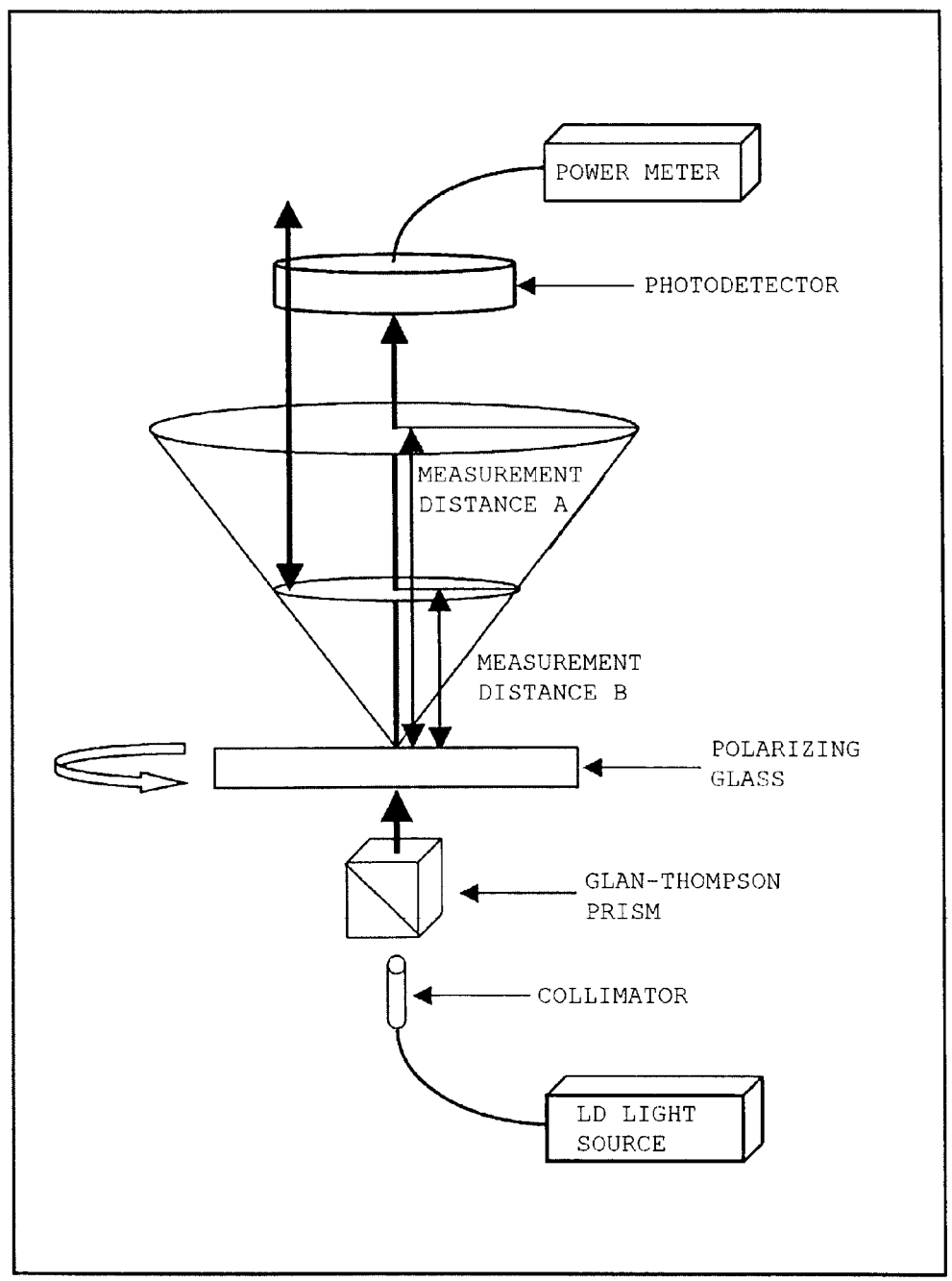

[FIG.5]
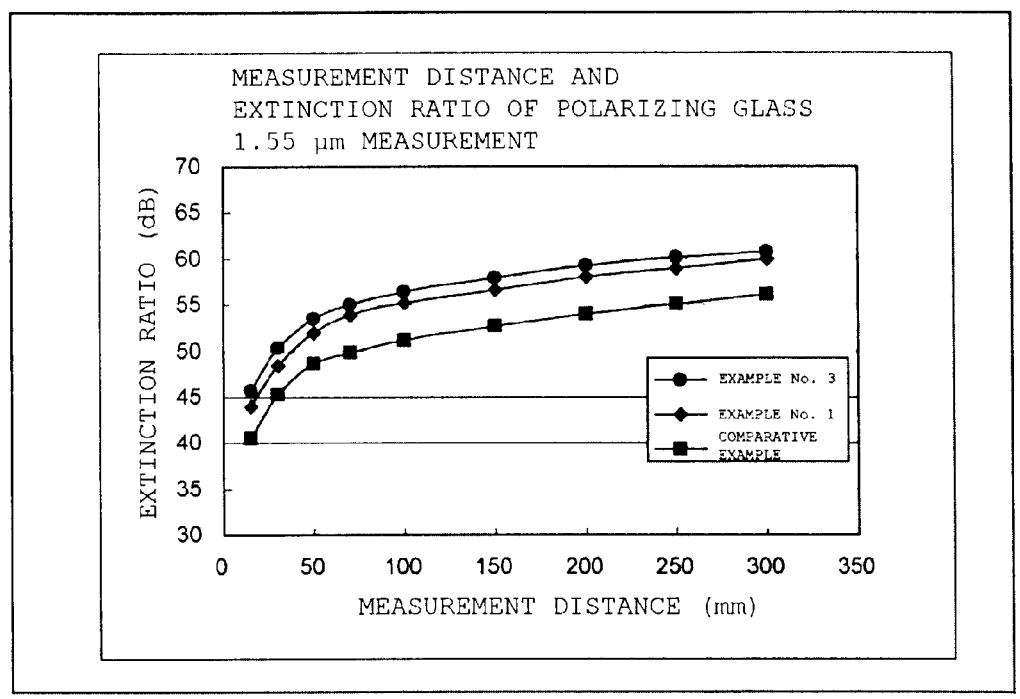

[FIG.6]
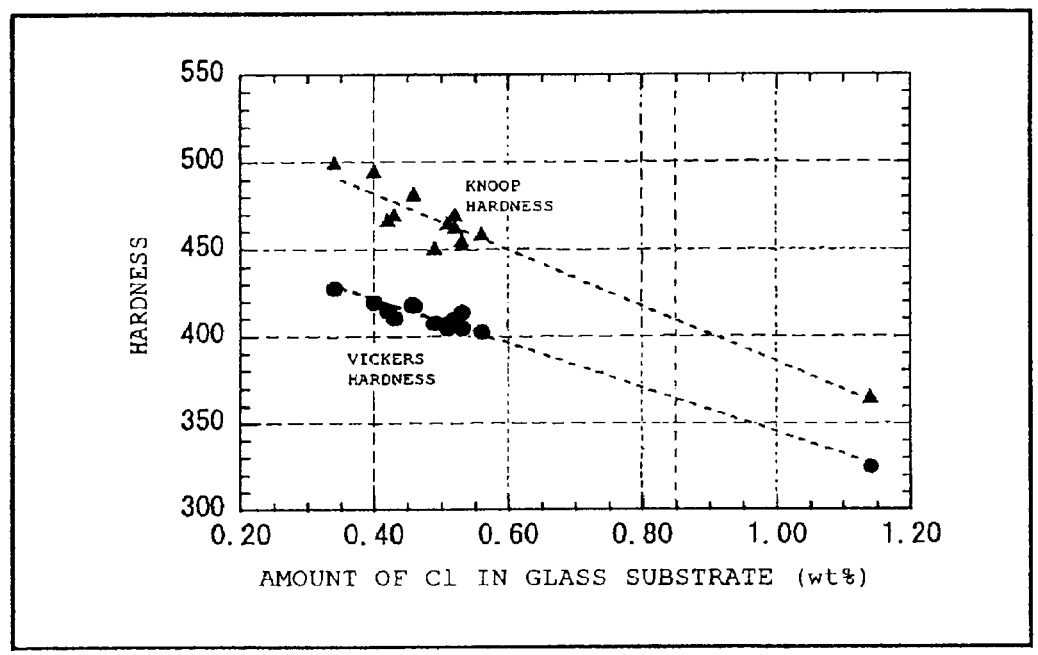

[FIG.7]
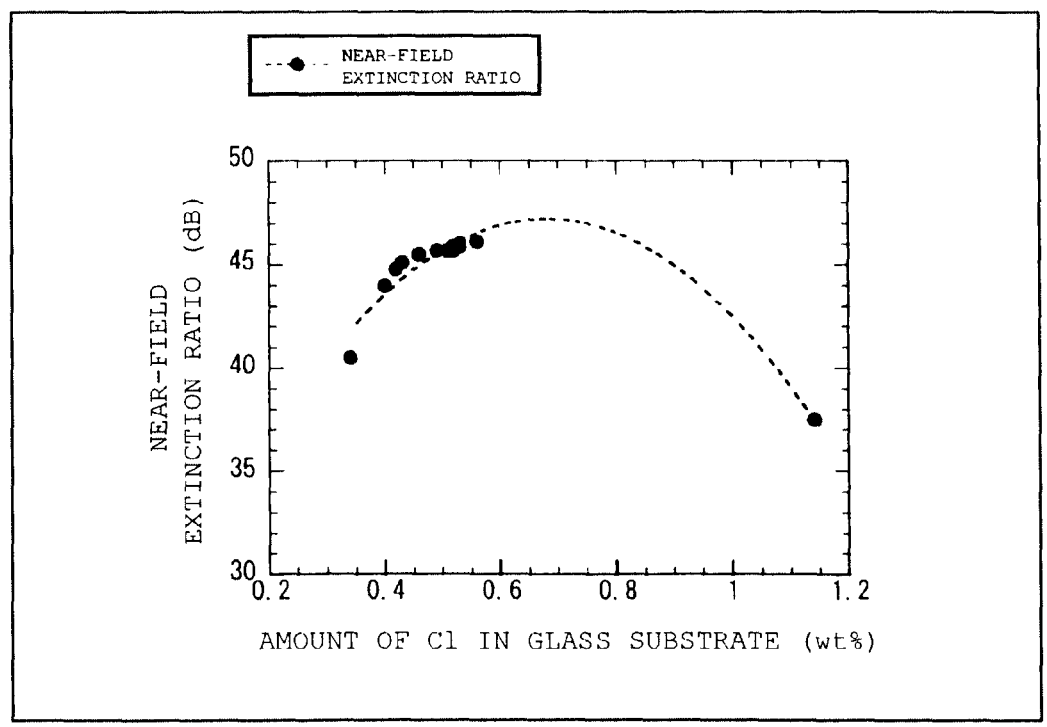

POLARIZING GLASS AND OPTICAL ISOLATOR

CROSS REFERENCES TO RELATED APPLICATIONS

This application is a continuation of International Patent Application No. PCT/JP09/067,938, filed on Oct. 16, 2009, and claims priority to Japanese Patent Application No. 2008-267994, filed on Oct. 16, 2008, the disclosures of which are incorporated herein by reference in their entireties.

BACKGROUND OF THE INVENTION

1. Field of the Invention

The present invention relates to polarizing glasses and in particular to a polarizing glass used as a polarizer in, for example, a compact optical isolator for optical communication etc.; an optical switch composed of liquid crystal, an electro-optic crystal, a Faraday rotator, and so forth; or an electro-magnetic sensor.

2. Description of Related Art

It is known that a glass having anisotropically shaped fine metal particles, such as silver particles or copper particles, oriented and dispersed therein can function as a polarizer because of its ability to change the light absorption wavelength band of the metal particles when the incident polarization direction is changed.

It is also well-known that such a polarizing glass can be produced by reducing a glass containing elongated copper halide particles or a glass containing elongated silver halide particles. For example, Japanese Unexamined Patent Application Publication No. 5-208844 discloses a process of producing a polarizing glass from a glass containing copper halide particles. This process will be described below. First, glass serving as a matrix is made to contain Cu ions and Cl ions. Next, the glass is melted and molded. Then, the glass is cut into an appropriate size, cast into a mold, and heat-treated. By doing so, CuCl microcrystals with grain sizes of 50 to 300 nm are precipitated. Thereafter, the glass material in which the CuCl microcrystals have been precipitated is processed into a slab, which serves as a preform. At a temperature that imparts a glass viscosity in the range of $10^7$ to $10^{10}$ Pa·S, the preform and the copper halide particles in the glass are elongated and then heat-treated in a reducing atmosphere. After the copper halide particles are reduced, a polarizing glass containing elongated, anisotropically shaped metallic copper particles is produced.

The polarizing properties of such a polarizing glass are represented in terms of the extinction ratio and the insertion loss defined by the Expressions below.

Extinction ratio=$-10 \text{ Log}(\square)(P///P\perp)[dB]$      Expression (1)

Insertion loss=$-10 \text{ Log}(P\perp/Pin)[dB]$      Expression (2)

where Pin: intensity of incident light, $P\perp$: intensity of exit light in the vertical (transmission) direction, and $P//$: intensity of exit light in the parallel (extinction) direction.

When the extinction ratio is to be measured, a measuring system as shown in FIG. 1 is normally used. Light with a wavelength of 1.31 μm or 1.55 μm emitted from a laser diode (LD) light source is converted via a collimating fiber into collimated light, which is incident upon a Glan-Thompson prism resulting in unidirectional linear polarization and is then incident upon a polarizing glass. Then, the polarizing glass is rotated, and the maximum and minimum amounts of light detected with a power meter are measured to calculate the extinction ratio based on Expression (1).

At this time, when the distance (measurement distance) between the polarizing glass and the power meter is changed, the calculated extinction ratio also changes. In short, the extinction ratio is small for a short measurement distance, whereas the extinction ratio is large for a long measurement distance. This is probably because weakly scattered light radiated from the polarizing glass in all directions is detected by the power meter, decreasing the extinction ratio, in the case of a short measurement distance, whereas less of such scattered light is detected by the power meter, increasing the extinction ratio, in the case of a long measurement distance.

This relationship between the measurement distance and the extinction ratio will be described by providing specific values.

A decrease of X (dB) in the extinction ratio of the polarizing glass, as a result of a decrease from A mm to B mm in the distance (measurement distance) between the polarizing glass and the power meter photodetector having an aperture portion, can be explained based on the schematic diagram shown in FIG. 4. In the case of the long measurement distance A, the amount of scattered light (in terms of photo-detection area) that can be detected by the power meter photodetector in the case of the short measurement distance B decreases in proportion to $(B/A)*2$. In contrast, when the measurement distance decreases from A to B, the amount of scattered light that can be detected increases in proportion to $(A/B)*2$.

In summary, assuming that the scattered light intensity is not angle-dependent, the decrease of X (dB) in the extinction ratio of the polarizing glass, as a result of a decrease from A mm to B mm in the distance (measurement distance) between the polarizing glass and the power meter photodetector with an aperture portion, can be roughly calculated from the following Expression as a model, based on the ratio between the power meter photodetector areas that can detect scattered light.

$X=10 \text{ Log}(A/B)*2$      Expression (3)

Although the actual decrease in the extinction ratio of the polarizing glass slightly deviates from the value calculated from Expression (3) because scattered light is angle-dependent in an actual copper-based polarizing glass, the extinction ratio at a measurement distance of 15 mm decreases to approximately 40 dB, compared with an extinction ratio of 55 dB at a measurement distance of 300 mm.

For these extinction ratio measurements of the polarizing glass, collimated light is used as the source light, with the shortest distance that can be measured by the measuring instrument being limited to a measurement distance of 15 mm, as shown in FIG. 1. In an optical system for use in an actual optical isolator, diverging light from a laser diode (LD) light source is focused by a lens onto the optical isolator. For this reason, the proportion of re-radiated light due to resonance scattering from the polarizing glass surface being accepted by an optical fiber decreases, compared with the optical system featuring collimated light shown in FIG. 1. Therefore, the decrease in the extinction ratio as a result of the measurement distance being decreased is slight. In other words, the values of the extinction ratio of the polarizing glass and the isolation of an optical isolator incorporating this polarizing glass do not always match, though the relationship between the extinction ratio and the isolation is such that as the extinction ratio increases, the isolation also increases.

An investigation was conducted to confirm the above-described fact.

For a copper-based polarizing glass with an extinction ratio of 40 dB at a measurement distance of 15 mm and at a wavelength of 1.55 μm, the extinction ratio measured at a measurement distance of 300 mm and at a wavelength of 1.55 µm was 56 dB. When a free space optical isolator for a wavelength of 1.55 µm was assembled in the same manner as described above to measure its isolation, the result was 36 dB, which demonstrates that the polarizing glass is suitable for use in the free space optical isolator.

On the other hand, when a pigtail optical isolator for a wavelength of 1.55 µm was assembled using the same sample, i.e., the copper-based polarizing glass with an extinction ratio of 40 dB at a measurement distance of 15 mm and at a wavelength of 1.55 µm, together with a commercially available garnet film, permanent magnet, and single mode fiber to measure the isolation of the isolator, the result was 28 dB.

Considering that the isolation of typical optical isolators is specified as 30 dB or more, the isolation of 28 dB was below the specification. That is, the polarizing glass with an extinction ratio of 40 dB or less at a measurement distance of 15 mm cannot be used in a pigtail optical isolator.

Nowadays, pigtail optical isolators in which the polarizing glass is bonded directly to the fiber are widely used as optical isolators for Metropolitan Area Networks. In such optical isolators, the near-field extinction ratio, defined as the extinction ratio for a short distance between the polarizing glass and the power meter, is important.

On the other hand, because it is presumed from the principle of Mie scattering that as the minor-axis diameter of anisotropic fine metal particles in the polarizing glass increases, this scattered light also increases, it is important to produce a polarizing glass containing anisotropic fine metal particles with minimized minor-axis diameters.

From the conclusion described above, to achieve a high near-field extinction ratio value, i.e., a high extinction ratio value for a short distance between the polarizing glass and the power meter, it is advantageous to increase the aspect ratio (major-axis diameter/minor-axis diameter) of the post-reduced metal particles by increasing the degree of stretching of the metal halide particles.

However, there has been a problem in that when metal halide particles are to be stretched by heat-stretching a preform, the preform easily breaks, decreasing the yield. This problem will be described in detail.

If the glass of the preform is hard, i.e., if the glass has a low flexibility, then it is difficult to stretch the preform. As a result, the preform needs to be stretched with a high tensile force to increase the degree of stretching of the metal halide fine particles. It is true that the rate of stretching of metal halide fine particles increases with a high tensile force, but the probability of the preform being broken due to that high tensile force also increases.

On the other hand, if the glass of the preform is soft, i.e., if the glass has a high flexibility, the preform can be stretched with a low tensile force. However, because such a glass has a low mechanical strength and is fragile, the glass may break even with a low tensile force.

Thus, because the required tensile force cannot be applied to the metal halide fine particles, whether the preform glass is hard or soft, in an attempt to stretch the preform with a tensile force such as not to cause glass breakage, it is difficult to increase the degree of stretching of the metal halide fine particles. Therefore, it is not possible to increase the near-field extinction ratio, as described below in detail.

To achieve a high extinction ratio, a tensile force that is almost as high as that at which the preform glass breaks is normally applied to stretch the preform in the stretching process. However, the rate of stretching of CuCl will not surpass a certain level, whether the preform glass is hard or soft, under conditions in which frequent breakage must be avoided in the production process. Consequently, the rate of stretching of the metal halide particles has not been enhanced due to an increase in the probability of fracture.

As described so far, when a known copper-based polarizing glass is to be stretched with a high tensile force in an attempt to increase the rate of stretching, i.e., the aspect ratio (major-axis diameter/minor-axis diameter), of metal halide fine particles in the form of precursors of anisotropic fine metal particles, there is a possibility of the glass being broken during the stretching process. For this reason, the minor-axis diameters of the anisotropic metal particles cannot be decreased if a high yield is to be achieved in the production process. Therefore, the extinction ratio at a measurement distance of 15 mm is as low as about 40 dB. Consequently, there has been a problem in that the isolation of a pigtail optical isolator incorporating a conventional polarizing glass is too low to satisfy an isolation performance of 30 dB or more, which is the specification of typical isolators, even though the same polarizing glass can be satisfactorily used in a free space optical isolator.

BRIEF SUMMARY OF THE INVENTION

A first aspect according to the present invention is a polarizing glass including anisotropically shaped copper particles oriented and dispersed in a glass substrate, wherein raw materials of the glass substrate are composed of, in terms of wt %:
$SiO_2$: 48-65,
$B_2O_3$: 13-33,
$Al_2O_3$: 6-13,
$AlF_3$: 0-5,
alkali metal oxide: 7-17,
alkali metal chloride: 0-5,
alkali earth metal oxide: 0-5,
copper oxide and copper halide: 0.3-2.5,
SnO: 0-0.6, and
$As_2O_3$: 0-5;
the Cl content in the glass substrate ranges from 0.40 to 0.85 wt % relative to the entire glass substrate; and the Vickers hardness of the glass substrate ranges from 360 to 420.

A second aspect according to the present invention is a polarizing glass including anisotropically shaped copper particles oriented and dispersed in a glass substrate, wherein the glass substrate is composed of, in terms of wt % relative to the entire glass substrate:
$SiO_2$: 55-63,
$B_2O_3$: 16-22,
$Al_2O_3$: 7-10,
alkali metal oxide: 8-12,
alkali earth metal oxide: 0-3,
copper oxide: 0.3-1.0,
SnO: 0-0.3,
$As_2O_3$: 0-3,
F: 0.5-1.0, and
Cl: 0.40-0.85;
and the Vickers hardness of the glass substrate ranges from 360 to 420.

A third aspect according to the present invention is a polarizing glass including anisotropically shaped copper particles oriented and dispersed in a glass substrate, wherein raw materials of the glass substrate are composed of, in terms of wt %:
$SiO_2$: 48-65,
$B_2O_3$: 13-33,
$Al_2O_3$: 6-13,
$AlF_3$: 0-5,
alkali metal oxide: 7-17,
alkali metal chloride: 0-5, alkali earth metal oxide: 0-5,
copper oxide and copper halide: 0.3-2.5,
SnO: 0-0.6, and
$As_2O_3$: 0-5;
the Cl content in the glass substrate ranges from 0.40 to 0.85 wt % relative to the entire glass substrate; and the Knoop hardness number of the glass substrate ranges from 400 to 495.

A fourth aspect according to the present invention is a polarizing glass including anisotropically shaped copper particles oriented and dispersed in a glass substrate, wherein the glass substrate is composed of, in terms of wt % relative to the entire glass substrate:
$SiO_2$: 55-63,
$B_2O_3$: 16-22,
$Al_2O_3$: 7-10,
alkali metal oxide: 8-12,
alkali earth metal oxide: 0-3,
copper oxide: 0.3-1.0,
SnO: 0-0.3,
$As_2O_3$: 0-3,
F: 0.5-1.0, and
Cl: 0.40-0.85;
and the Knoop hardness number of the glass substrate ranges from 400 to 495.

A fifth aspect according to the present invention is a polarizing glass including anisotropically shaped metal particles oriented and dispersed in a glass substrate, wherein the glass substrate is glass selected from the group consisting of silicate glass, borate glass, and borosilicate glass; the glass substrate contains at least one component selected from the group consisting of $Y_2O_3$, $La_2O_3$, $V_2O_3$, $Ta_2O_3$, $WO_3$, and $Nb_2O_5$; the content of each of the selected components ranges from 0.05 to 4 mole percent, or the total content of the components is 6 mole percent or less if a plurality of components are selected; and the Cl content in the glass substrate ranges from 0.40 to 0.85 wt % relative to the entire glass substrate.

A sixth aspect according to the present invention is characterized in that, in any of the first to fourth aspects, the glass substrate is a glass selected from the group consisting of silicate glass, borate glass, and borosilicate glass; the glass substrate contains at least one component selected from the group consisting of $Y_2O_3$, $La_2O_3$, $V_2O_3$, $Ta_2O_3$, $WO_3$, and $Nb_2O_5$; and the content of each of the selected components ranges from 0.05 to 4 mole percent, or the total content of the components is 6 mole percent or less if a plurality of components are selected.

A seventh aspect according to the present invention is characterized in that, in any of the first to sixth aspects, an extinction ratio at a measurement distance of 15 mm is 44 dB or more in response to at least one of light in a wavelength band with a center wavelength of 1.31 µm and light in a wavelength band with a center wavelength of 1.55 µm.

An eight aspect according to the present invention is characterized in that, in any of the first to seventh aspects, the maximum of the absolute values of the amounts of shift in a polarization axis at sites 5 mm away from a center point on a principle surface is 0.15° or less.

A ninth aspect according to the present invention is an optical isolator including the polarizing glass described in any of the first to eighth aspects.

A tenth aspect according to the present invention is an optical isolator including a Faraday rotating element and at least one polarizer, wherein the polarizer includes the polarizing glass described in any of the first to ninth aspects.

An eleventh aspect according to the present invention is a process of producing a polarizing glass containing anisotropically shaped metal particles oriented and dispersed in a glass substrate by stretching a glass preform, the process including melting raw materials of the glass substrate in an airtight melting furnace; and replacing at least one of the alkali oxide components in the raw materials of the glass substrate with an alkali chloride component, wherein the Cl content in the glass substrate ranges from 0.40 to 0.85 wt % relative to the entire glass substrate.

A twelfth aspect according to the present invention is related to the eleventh aspect and characterized in that the anisotropically shaped metal particles are copper particles; raw materials of the glass substrate are melted, the raw materials being composed of, in terms of wt %:
$SiO_2$: 48-65,
$B_2O_3$: 13-33,
$Al_2O_3$: 6-13,
$AlF_3$: 0-5,
alkali metal oxide: 7-17,
alkali metal chloride: 0-5,
alkali earth metal oxide: 0-5,
copper oxide and copper halide: 0.3-2.5,
SnO: 0-0.6, and
$As_2O_3$: 0-5;
and the Vickers hardness of the glass substrate ranges from 360 to 420.

A thirteenth aspect according to the present invention is related to the eleventh aspect and characterized in that the anisotropically shaped metal particles are copper particles; raw materials of the glass substrate are melted, the raw materials being composed of, in terms of wt %:
$SiO_2$: 48-65,
$B_2O_3$: 13-33,
$Al_2O_3$: 6-13,
$AlF_3$: 0-5,
alkali metal oxide: 7-17,
alkali metal chloride: 0-5,
alkali earth metal oxide: 0-5,
copper oxide and copper halide: 0.3-2.5,
SnO: 0-0.6, and
$As_2O_3$: 0-5;
and the Knoop hardness number of the glass substrate ranges from 400 to 495.

According to the present invention, metal halide fine particles can be made relatively stretchable, and the minor-axis of the anisotropic fine metal particles can be reduced by providing a relatively stretchable glass serving as a matrix, thereby providing a polarizing glass with a high near-field extinction ratio at a short measurement distance.

BRIEF DESCRIPTION OF THE SEVERAL
VIEWS OF THE DRAWINGS

FIG. 1 illustrates measurement of an extinction ratio.
FIG. 2 shows the structure of a glass serving as a matrix according to the present invention.
FIG. 3 shows the structure of a pigtail optical isolator.
FIG. 4 illustrates measurement distances and the ratio between photo-detection areas.
FIG. 5 illustrates the relationship between the measurement distance and the extinction ratio.
FIG. 6 illustrates the relationship between the amount of Cl in a glass substrate, and the Vickers hardness and the Knoop hardness number.
FIG. 7 illustrates the relationship between the amount of Cl in a glass substrate and the near-field extinction ratio.

DETAILED DESCRIPTION OF THE INVENTION

To produce a polarizing glass with a high near-field extinction ratio at a high yield while still preventing the preform from breaking when it is stretched with a tensile force high enough to increase the aspect ratios of metal halide fine particles, the preform needs to endure that tensile force so as not to break. In the current description, the nature of the glass of a preform capable of being stretched with a higher tensile force without breaking is referred to as "easily stretchable" or "superior in the ease of stretching."

How easily a preform glass can be stretched depends on the strength of the glass structure (referred to as the glass framework structure).

For example, a glass with a strong glass structure does not easily stretch, and will break if an attempt is made to stretch the glass with a high tensile force.

On the other hand, although a glass with a weak glass structure easily stretches with a low tensile force, such a glass easily breaks even with a lower tensile force due to the weak glass structure, and therefore, it is not possible to apply an appropriately high tensile force when the glass is to be stretched. For this reason, the aspect ratios of the metal halide fine particles cannot be increased.

This means that it is difficult to stretch a glass, whether it has a strong glass structure or a weak glass structure. In other words, such a glass has low ease of stretching. To produce a polarizing glass with a high near-field extinction ratio, i.e., to achieve an object of the present invention, it is necessary to increase the ease of stretching of the glass serving as a matrix.

The following two factors can be considered to control the strength of the glass structure as to the ease of stretching of the glass serving as a matrix.

(1) Temperature at the Time of Stretching

The glass structure is weak at high temperature, whereas the glass structure is strong at low temperature.

(2) The Amount of Alkali Metal Oxides, Boric Acids, Phosphoric Acids, and so Forth in the Glass Substrate The glass structure becomes weaker with a high concentration of alkali metal oxides, boric acids, phosphoric acids, and so forth in the glass substrate, whereas the glass structure becomes stronger with a lower concentration of those substances.

With the composition of a known polarizing glass, it was not possible to apply a high tensile force to the preform because it would break due to the tensile force, whether the temperature at the time of stretching was high or low, thus inhibiting the aspect ratios of the metal halide fine particles from increasing.

On the other hand, means for adjusting the component amounts of alkali metal oxides, boric acids, phosphoric acids, and so forth, based on the composition of a known polarizing glass, was problematic in that "the chemical durability of the glass may decrease," "the glass may be crystallized," "crystallization of the metal halide fine particles may be adversely affected (crystallization is inhibited, large crystals are precipitated)," and so forth.

In a situation where such problems exist, the inventors have made intensive efforts to find means for enhancing the ease of stretching of a preform glass. As a result, the inventors have found that the strength of the glass structure greatly changes depending on the amount of Cl contained in the glass serving as a matrix. More specifically, the inventors have found that the glass structure becomes stronger as the amount of Cl decreases, increasing the Vickers hardness and the Knoop hardness number of the glass serving as a matrix, whereas the glass structure becomes weaker as the amount of Cl in the glass serving as a matrix increases. Furthermore, the inventors have found that the Vickers hardness or the Knoop hardness number of the glass serving as a matrix decreases with an increase in the amount of Cl in the glass serving as a matrix.

The inventors have found that as a result of a decrease in the Vickers hardness or the Knoop hardness number, the near-field extinction ratio of the polarizing glass obtained from the preform glass can be increased.

This embodiment will now be described.

To produce a polarizing glass with a high extinction ratio, i.e., to achieve an object of the present invention, the raw materials of the polarizing glass should preferably be composed of $SiO_2$: 48-65, $B_2O_3$: 13-33, $Al_2O_3$: 6-13, $AlF_3$: 0-5, alkali metal oxides: 7-17, alkali metal chlorides: 0-5, alkali earth metal oxides: 0-5, copper oxides and copper halides: 0.3-2.5, SnO: 0-0.6, and $As_2O_3$: 0-5 on a wt % basis in such a manner that the composition constitutes 100 wt % in total.

For the above-described individual components, the following substances are used, for example.

$SiO_2$: $SiO_2$ etc.

$B_2O_3$: $H_3BO_3$, $B_2O_3$, etc.

$Al_2O_3$: Al $(OH)_3$, $Al_2O_3$, etc.

Alkali metal oxides: carbonates, nitrates, chlorides, fluorides, etc.

Alkali earth metal oxides: carbonates, nitrates, chlorides, fluorides, etc.

Copper oxide: oxide, chloride, fluoride, nitrate, etc.

SnO: SnO, $SnO_2$, etc.

$As_2O_3$: $As_2O_3$ etc.

F: cationic fluorides of the above-described oxide components (e.g., $AlF_3$)

Cl: cationic chlorides of the above-described oxide components (e.g., NaCl)

In this embodiment, the amount of Cl contained in this glass substrate accounts for 0.40 to 0.85 wt % relative to the entire glass substrate constituting the polarizing glass. Although described later in detail, with the amount of Cl in the glass substrate falling within the above-described range, the aspect ratio of the metal halide fine particles can be increased by increasing the percentage of weak bonds to all bonds in the glass when it is stretched with such a tensile force as not to cause breakage, thereby enhancing the near-field extinction ratio of the glass.

In this case, means for introducing Cl into the glass serving as a matrix includes those listed below. Any of these means can be employed.

Means 1: Replacing some of raw materials ($Na_2CO_3$, $KNO_3$, etc.) of an alkali oxide component (e.g., $Na_2O$ or $K_2O$) with a raw material containing an alkali element and Cl (e.g., NaCl or KCl).

Means 2: Adding a raw material containing Cl, such as $NH_4Cl$, HClO, or $HClO_3$.

Means 3: Spraying the glass melt with a gas containing Cl (e.g., $Cl_2$ or $SOCl_2$) while the glass serving as a matrix is being melted.

Means 4: Bubbling the glass melt using a gas containing Cl (e.g., $Cl_2$ or $SOCl_2$) while the glass serving as a matrix is being melted.

It should be noted, however, that because Cl-containing gases are extremely toxic and need to be handled with extreme care, use of Cl-containing gases is not preferable. Furthermore, if means for increasing the percentage of raw materials containing Cl (e.g., increasing the amount of replacement from $NaCO_3$ to NaCl) or means for adding a large amount of Cl sources (e.g., $NH_4Cl$) were employed because Cl easily volatilizes during glass melting and hardly remains in the glass, gases containing highly toxic Cl would be emitted from the melting furnace into the atmosphere, which would require an extensive toxic substance elimination facility. For this reason, these means are not preferable, either.

To address these difficulties, this embodiment has made it possible, by satisfying any of the following conditions, to increase the Cl concentration in the glass without having to use gases containing highly toxic Cl or without having to increase the Cl concentration in the glass raw materials.

Condition 1: Adding at least one component selected from the group consisting of $Y_2O_3$, $La_2O_3$, $V_2O_5$, $Ta_2O_5$, $WO_3$, and $Nb_2O_5$ to the components constituting the glass.

Condition 2: Melting the glass in a highly airtight melting furnace.

Under Condition 1, when at least one component selected from among $Y_2O_3$, $La_2O_3$, $V_2O_5$, $Ta_2O_5$, $WO_3$, and $Nb_2O_5$ is added to the glass composition, the Cl concentration in the glass can be increased, compared with the composition to which none of these components are added. Although the mechanism of increase of the amount of Cl remaining in the glass is not clear, it is presumed that adding at least one component selected from among $Y_2O_3$, $La_2O_3$, $V_2O_5$, $Ta_2O_5$, $WO_3$, and $Nb_2O_5$ into the glass prevents the glass melting temperature from increasing significantly, increases the viscosity of the glass melt, and suppresses volatilization of Cl during melting, thus increasing the amount of remaining Cl.

When at least one of $Y_2O_3$, $La_2O_3$, $V_2O_5$, $Ta_2O_5$, $WO_3$, and $Nb_2O_5$ is added to the glass in this manner, Cl easily remains in the glass. In the glass substrate after having become a glass, the content of one of these components should preferably fall within 0.05 to 4% in terms of mol %, and the total content of two or more of these components should preferably be below 6% in terms of mol %. When the contents of the added components are below 0.05%, the effect of causing Cl to remain in the glass is small. On the other hand, when the content of an component is above 4% or the total content of two or more components are above 6%, problems, such as the glass being easily crystallized and the thermal characteristic being increased (the stretching temperature being increased), are raised.

Although oxides ($Y_2O_3$, $La_2O_3$, $V_2O_5$, $Ta_2O_5$, $WO_3$, and $Nb_2O_5$) are mainly used for the raw materials of these added components, some or all of these oxides may be replaced with fluorides or chlorides.

On the other hand, the term "highly airtight melting furnace" in the context of Condition 2 refers to a melting furnace that has been made more airtight by, for example, not providing a front door through which a batch of raw materials is delivered or a test glass is collected. With a highly airtight melting furnace, the Cl concentration in the atmosphere surrounding a crucible filled with a glass melt is maintained. As a result, Cl is prevented from volatilizing from the glass melt, thereby increasing the amount of Cl in the glass. A melting furnace without a front door is just one example of a highly airtight melting furnace. A highly airtight melting furnace generally refers to a furnace having only a few gaps through which the atmosphere in the melting furnace leaks outside. Furthermore, with a highly airtight melting furnace, the airtightness of the furnace can be increased, whether it is a batch melting furnace or a continuous melting furnace. As a result, the amount of Cl in the glass can be increased. For a batch melting furnace, the Cl concentration in the atmosphere interfacing with the glass melt can also be maintained by placing a lid over the pot in which the glass serving as a matrix is melted, which brings about the same effect as when a highly airtight melting furnace is used.

As described above, when a glass substrate that will become a polarizing glass is to be produced from glass raw materials, the glass substrate after having become a glass should preferably be composed of $SiO_2$: 55-63, $B_2O_3$: 16-22, $Al_2O_3$: 7-10, alkali metal oxide: 8-12, alkali earth metal oxide: 0-3, copper oxide: 0.3-1.0, SnO: 0-0.3, $As_2O_3$: 0-3, F: 0.5-1.0, and Cl: 0.40-0.85, in terms of wt %, in such a manner that the composition constitutes 100 wt % in total.

As described above, in this embodiment, when a glass substrate that will become a polarizing glass is to be produced, the composition of the glass substrate after having become a glass contains 0.40 to 0.85 wt % of Cl. The reason for this will be described below in detail.

First, the structure of an oxide glass will be described.

In an oxide glass containing $SiO_2$, it is presumed that tetrahedrons each composed of an Si atom and four oxygens surrounding the Si are bonded with bridging oxygens such that these tetrahedrons spread three-dimensionally in a net-like manner. As the amount of Cl in the glass having the glass structure shown in FIG. 2(a) increases, Cl atoms break into the positions of some bridging oxygens, changing the strong covalent bonding of the bridging oxygens to the weak ionic binding of Cl, as shown in FIG. 2(b). As a result, partially weak bonding occurs in the glass structure, which thus becomes weak. In contrast, when the amount of Cl in the glass decreases, the number of partially weak bonds decreases, making the glass structure strong.

As shown below (Source: HANDBOOK of CHEMISTRY and PHYSICS $79^{TH}$ EDITION etc.), Cl ions have larger diameters than cations, such as Si, and anions, such as O, used in a polarizing glass, and even a slight change in the amount of Cl greatly affects the glass structure.

Si: 0.26-0.40 Å
B: 0.20 Å
Al: 0.39-0.54 Å
Na: 0.99-1.24 Å
O: 1.40 Å
F: 1.36 Å
Cl: 1.81 Å

For a specific example of the above-described theory, how the glass structure changes as a result of introduction of Cl into the glass can be explained by way of analogy of a rubber band. Just as an old rubber band easily stretches, a structure containing partially weak bonding (refer to FIG. 2(b)) features high ease of stretching in response to a tensile force. On the other hand, in the same manner as a very old rubber band containing an extremely large amount of weak bonding easily breaks with a weak force, a glass containing increased weak bonding (i.e., a large amount of Cl) breaks with a weak tensile force.

The amount of partially weak bonding in the glass, that is, the strength of the glass structure, is reflected in the hardness of the glass. The Vickers hardness and the Knoop hardness number of a glass with a strong glass structure (small amount of partially weak bonding) have a tendency to become high, whereas the Vickers hardness and the Knoop hardness number of a glass with a weak glass structure (large amount of partially weak bonding) have a tendency to become low.

In this embodiment, the glass melting conditions and the composition of delivery raw materials are adjusted so that the amount of Cl contained in the glass serving as a matrix falls within a range of 0.40 wt % to 0.85 wt %. By doing so, the Vickers hardness of the glass serving as a matrix is set at 360 to 420, or the Knoop hardness number of the same glass is set at 400 to 495. As a result, the near-field extinction ratio measured at a measurement distance of 15 mm is increased to 44 dB or more.

In this case, if the amount of Cl in the glass is below 0.40 wt %, the above-described effect of increasing the aspect ratio due to softening of the glass preform cannot be brought about.

On the other hand, if the amount of Cl in the glass is above 0.85 wt %, the percentage of weak bonds to all bonds in the glass increases, making the glass structure extremely weak. In this case, the preform is so likely to break at the time of stretching that if the preform is stretched with such a tensile force as not cause breakage, the aspect ratio of metal halide fine particles will not increase, and what is even worse, the near-field extinction ratio may decrease in some cases.

Here, the relationship between the amount of Cl in the glass and the near-field extinction ratio measured at a measurement distance of 15 mm is shown in FIG. 7, and the relationship between the amount of Cl in the glass and the hardness (Vickers hardness and Knoop hardness number) of the glass is shown in FIG. 6. These figures show that if the amount of Cl in the glass ranges from 0.40 wt % to 0.85 wt %, the Vickers hardness is from 360 to 420 (FIG. 6), the Knoop hardness number is from 400 to 495 (FIG. 6), and the near-field extinction ratio measured at a measurement distance of 15 mm is 44 dB or more (FIG. 7).

Both the Vickers hardness and the Knoop hardness number are indices of hardness with respect to a certain reference and do not usually have a unit. It is also known that both the Vickers hardness and the Knoop hardness number vary in measurements. For this reason, in the present embodiment and Examples, measurement is carried out assuming that the records of measured specimens (particularly, physical states such as residual stress) are the same. Furthermore, measurement is carried out more than once for the same specimen, or more than one specimen is produced for the same glass if necessary, to average out the measurement variations when physical properties are compared.

Next, the reason that when a glass substrate that will become a polarizing glass is to be produced, Cl should account for 0.40 to 0.85 wt % of the composition of the glass substrate after having become a glass will be described from the viewpoint of oxide glass structure, as well as from the viewpoint of the grain size of metal particles.

As described above, when the amount of Cl remaining in the glass is 0.40 wt % or more, the Vickers hardness of the glass serving as a matrix is 420 or less, or the Knoop hardness number is 495 or less. Therefore, the near-field extinction ratio of a polarizing glass produced from this glass serving as a matrix increases to 44 dB or more when measured at a measurement distance of 15 mm.

In this embodiment, CuCl fine particles or AgCl fine particles with a grain size of 50 to 300 nm are precipitated by heat-treating a transparent glass, serving as a matrix, containing Cl ions and either of Cu ions and Ag ions. On the other hand, when the amount of Cl in the glass exceeds 0.85 wt %, CuCl crystals or AgCl crystals with large grain sizes are precipitated as soon as the glass serving as a matrix is produced, readily producing a white turbid glass. In such a glass, it becomes difficult to control the grain sizes of CuCl or AgCl crystals to be precipitated by heat treatment, and crystals with large grain sizes are generated in a certain percentage.

As a result, a polarizing glass with high insertion loss and low performance is produced.

As described above, when the amount of Cl in the glass serving as a matrix exceeds 0.85 wt %, the glass is not suitable as a matrix for a polarizing glass with a high near-field extinction ratio. The hardness of a glass containing more than 0.85 wt % of Cl becomes much lower because of an increase in weak bonds in the glass. The Vickers hardness and the Knoop hardness number of a glass containing more than 0.85 wt % of Cl are less than 360 and less than 400, respectively. Whether a glass serving as a matrix is suitable or not can be determined by measuring its hardness.

In this embodiment, the polarizing glass produced in this manner is also used as an optical isolator, which will be described below. In a process in which two sheets of polarizing glass are bonded so as to sandwich a garnet film between them and are cut into a small size, the problem of a shift in the polarization axis on the polarizing glass surface occurs. Here, with respect to the reference angle at which the highest extinction ratio can be obtained at the center position on the surface of a polarizing glass about 10 to 15 mm square, the absolute value of the difference between the reference angle and the angle that gives the highest extinction ratio at a site away from the center position is referred to as the shift in the polarization axis. In a process in which two sheets of polarizing glass are bonded so as to sandwich a garnet film between them and cut into a square of about 0.5 mm as described above, the two sheets of bonded polarizing glass are bonded shifted by 45° at the perimeters of the polarizing glass if the shift in the polarization axis is large on the polarizing glass surface. As a result, when the optical isolator is assembled, an appropriate isolation cannot be achieved.

Here, generation of a shift in the polarization axis of the polarizing glasses is regarded as a type of shape regression occurring during preform drawing. The polarization axes, significantly deformed to open in a V shape, are considered to open in a significantly small inverted-V shape just before the structure is frozen to a predetermined width in the drawing process.

A glass serving as a matrix, according to this embodiment, whose mechanical strength is relatively low because of 0.40 to 0.85 wt % of Cl contained in the glass substrate has a partially weak structure. For this reason, the resilience for restoring the polarization axes is considered to be small at the microscopic level.

In fact, the inventors of the present invention have confirmed that when the Vickers hardness of the glass serving as a matrix is 420 or less or the Knoop hardness number is 495 or less, the absolute value of the maximum of the shifts in the polarization axis at points 5 mm away from the center position on the main surface of the polarizing glass decreases to 0.15° or less. However, because a glass with a Vickers hardness of less than 360 or a Knoop hardness number of less than 400 breaks or exhibits a low near-field extinction ratio as described above, the Vickers hardness of the glass serving as a matrix needs to be from 360 to 420 and the Knoop hardness number from 400 to 495.

EXAMPLES

The present invention will now be described by way of Examples. It should be noted, however, that the present invention is not limited by the Examples described below.

Before Examples and Comparative Examples are described, the meaning of the composition of raw materials in Tables 1, 2, and 5 showing the composition of raw materials of the glass substrate is described.

In Tables 1, 2, and 5, the values for the metal chlorides (NaCl and CuCl in Tables 1 and 2 and AgCl in Table 5) and the metal fluoride ($AlF_3$ in Table 1) used as a Cl source and an F source represent their content percentages in the form of raw materials. On the other hand, the values for the other oxides represent their content percentages not in the form of raw materials used but in the form of oxides produced from the raw materials used. For example, "$Na_2O$" does not mean used raw materials but oxides produced from $Na_2CO_3$ or $NaNO_3$ used as raw materials. In addition, the values for "$Na_2O$" mean the content percentages in the form of $Na_2O$ produced from those raw materials. When Cl and F are to be introduced into a glass, metal chlorides and metal fluorides are normally used as raw materials, but Cl and F do not readily remain in the glass because they easily volatilize during melting. This is why the content percentages in the form of raw materials were employed.

In addition, when a minor component is contained in the glass, like a colored glass used as a colored glass filter or a polarizing glass according to the present invention, the minor component is usually added to the original glass in mass ratio for the composition of raw materials. For the composition of raw materials according to the present invention, CuCl, AgCl, and SnO are minor components and are represented in mass ratio.

Examples in a Case where Cu Particles are Contained

First, Examples of a glass containing Cu particles are described. Glasses with the composition described (in terms of weight %) in Example Nos. 1 to 3, 6, and 7 of Table 1 were produced as described below. Raw materials were delivered in nine batches in three hours at 1350° C. into a 5-liter platinum crucible placed in a cubic, highly hermetic 800×800×800 mm-capacity melting furnace without a front door. Subsequently, the raw materials were left at rest for 30 minutes and melted. Thereafter, the temperature was increased to 1410° C., and the raw materials were left at rest for 30 minutes. Then, the raw materials were stirred with a crank-type stirring rod at a rotational speed of 80 rpm for 30 minutes and left at rest for 30 minutes. This was repeated twice. Then, after stirring for a third time for 30 minutes, the raw materials were left at rest for two hours to remove air bubbles in the glass melt, and the temperature was decreased to 1390° C. in 30 minutes. Then, the raw materials were subjected to finish stirring for 90 minutes at a rotational speed of 50 rpm, poured into a casting mold, and cooled slowly at 490° C. to produce a glass block.

TABLE 1

| | | Example | | | | | | | |
|---|---|---|---|---|---|---|---|---|---|
| | | No. 1 | No. 2 | No. 3 | No. 4 | No. 5 | No. 6 | No. 7 | No. 8 |
| Raw material composition in glass substrate/ wt % | $SiO_2$ | 59.87 | 59.87 | 59.87 | 58.84 | 57.81 | 59.87 | 59.87 | 58.84 |
| | $AlF_3$ | 2.04 | 2.04 | 2.04 | 2.00 | 1.97 | 2.04 | 2.04 | 2.00 |
| | $Al_2O_3$ | 6.82 | 6.82 | 6.82 | 6.70 | 6.59 | 6.82 | 6.82 | 6.71 |
| | $B_2O_3$ | 20.54 | 20.54 | 20.54 | 20.18 | 19.84 | 20.54 | 20.54 | 20.18 |
| | NaCl | 1.23 | 1.36 | 1.70 | 1.67 | 1.64 | 2.04 | 2.35 | 2.31 |
| | $Na_2O$ | 9.50 | 9.37 | 9.03 | 8.87 | 8.72 | 8.69 | 8.38 | 8.23 |
| | $Y_2O_3$ | | | | 1.74 (0.50) | 3.43 (1.00) | | | 1.73 (0.50) |
| | $La_2O_3$ | | | | | | | | |
| | $V_2O_5$ | | | | | | | | |
| | $Ta_2O_5$ | | | | | | | | |
| | $WO_3$ | | | | | | | | |
| | $Nb_2O_5$ | | | | | | | | |
| | Subtotal | 100.00 | 100.00 | 100.00 | 100.00 | 100.00 | 100.00 | 100.00 | 100.00 |
| | CuCl | 0.5203 | 0.5203 | 0.5203 | 0.5203 | 0.5203 | 0.5203 | 0.5203 | 0.5203 |
| | SnO | 0.0913 | 0.0913 | 0.0913 | 0.0913 | 0.0913 | 0.0913 | 0.0913 | 0.0913 |
| | Total | 100.6116 | 100.6116 | 100.6116 | 100.6116 | 100.6116 | 100.6116 | 100.6116 | 100.6116 |
| Cl content/wt % | | 0.40 | 0.46 | 0.49 | 0.53 | 0.56 | 0.43 | 0.42 | 0.47 |
| Vickers Hv | Avg. | 420 | 418 | 408 | 405 | 403 | 411 | 415 | 414 |
| | Max. | 427 | 428 | 415 | 413 | 412 | 427 | 423 | 423 |
| | Min. | 413 | 400 | 401 | 398 | 394 | 400 | 409 | 403 |
| Knoop Hk | Avg. | 495 | 482 | 451 | 455 | 459 | 470 | 467 | 453 |
| | Max. | 501 | 493 | 459 | 465 | 468 | 479 | 476 | 464 |
| | Min. | 482 | 472 | 446 | 449 | 450 | 462 | 457 | 441 |
| Near-field extinction ratio*/dB | | 44.0 | 45.5 | 45.7 | 45.9 | 46.1 | 45.1 | 44.8 | 45.5 |
| Shift in polarization axis/° | | 0.150 | 0.136 | 0.129 | 0.121 | 0.108 | 0.136 | 0.142 | 0.131 |

Note:
Values in parentheses in $Y_2O_3$, $La_2O_3$, $Ce_2O_3$, $V_2O_5$, $Ta_2O_5$, $WO_3$, and $Nb_2O_5$ fields indicate contents in terms of mol %.
Near-field extinction ratios indicate values measured at a measurement distance of 15 mm.

TABLE 2

| | | Example | | | | | Comparative Example | |
|---|---|---|---|---|---|---|---|---|
| | | No. 9 | No. 10 | No. 11 | No. 12 | No. 13 | No. 1 | No. 2 |
| Raw material composition in glass substrate/ wt % | $SiO_2$ | 58.39 | 59.04 | 57.88 | 58.81 | 58.66 | 59.87 | 56.39 |
| | $AlF_3$ | 1.98 | 2.01 | 1.97 | 2.00 | 1.99 | 2.04 | 2.5 |
| | $Al_2O_3$ | 6.65 | 6.72 | 6.59 | 6.70 | 6.68 | 6.82 | 9.05 |
| | $B_2O_3$ | 20.03 | 20.25 | 19.85 | 20.17 | 20.12 | 20.54 | 20.36 |
| | NaCl | 1.66 | 1.68 | 1.64 | 1.67 | 1.66 | 1.23 | 7.22 |
| | $Na_2O$ | 8.80 | 8.90 | 8.73 | 8.87 | 8.84 | 9.50 | 4.48 |
| | $Y_2O_3$ | | | | | | | |
| | $La_2O_3$ | 2.49 (0.50) | | | | | | |

TABLE 2-continued

|  |  | Example | | | | | Comparative Example | |
| --- | --- | --- | --- | --- | --- | --- | --- | --- |
|  |  | No. 9 | No. 10 | No. 11 | No. 12 | No. 13 | No. 1 | No. 2 |
| $V_2O_5$ |  |  | 1.40 (0.50) |  |  |  |  |  |
| $Ta_2O_5$ |  |  |  | 3.34 (0.50) |  |  |  |  |
| $WO_3$ |  |  |  |  | 1.78 (0.50) |  |  |  |
| $Nb_2O_5$ |  |  |  |  |  | 2.04 (0.50) |  |  |
| Subtotal |  | 100.00 | 100.00 | 100.00 | 100.00 | 100.00 | 100.00 | 100.00 |
| CuCl |  | 0.5203 | 0.5203 | 0.5203 | 0.5203 | 0.5203 | 0.5203 | 1.096 |
| SnO |  | 0.0913 | 0.0913 | 0.0913 | 0.0913 | 0.0913 | 0.0913 | 0.0913 |
| Total |  | 100.61 | 100.6116 | 100.6116 | 100.6116 | 100.6116 | 100.6116 | 101.1873 |
| Cl content/wt % |  | 0.51 | 0.52 | 0.51 | 0.52 | 0.52 | 0.34 | 1.14 |
| Vickers Hv | Avg. | 408 | 410 | 405 | 406 | 408 | 428 | 325 |
|  | Max. | 414 | 417 | 416 | 415 | 416 | 439 | 333 |
|  | Min. | 402 | 402 | 399 | 400 | 402 | 415 | 318 |
| Knoop Hk | Avg. | 465 | 470 | 465 | 470 | 463 | 504 | 365 |
|  | Max. | 472 | 480 | 473 | 478 | 470 | 509 | 372 |
|  | Min. | 458 | 463 | 458 | 463 | 456 | 497 | 356 |
| Near-field extinction ratio*/dB |  | 45.7 | 45.8 | 45.7 | 45.9 | 45.7 | 40.5 | 37.5 |
| Shift in polarization axis/° |  | 0.125 | 0.124 | 0.124 | 0.123 | 0.123 | 0.182 | 0.153 |

Note:
Values in parentheses in $Y_2O_3$, $La_2O_3$, $V_2O_5$, $Ta_2O_5$, $WO_3$, and $Nb_2O_5$ fields indicate contents in terms of mol %.
Near-field extinction ratios indicate values measured at a measurement distance of 15 mm.

Glasses with the composition according to Example Nos. 4, 5, and 8 in Table 1 and Example Nos. 9 to 13 in Table 2 are examples of glasses containing components $Y_2O_3$, $La_2O_3$, $V_2O_5$, $Ta_2O_5$, $WO_3$, and $Nb_2O_5$. These glasses were produced as glass blocks in the same manner as Example Nos. 1 to 3, 6, and 7, except that the melting temperature was 20° C. higher than that of Example No. 1 etc. in all schedules and the slow cooling temperature was 505° C.

From each of these glass blocks, a measuring specimen 15.0 mm in diameter and 7 mm in thickness, with one surface optically polished and the other polished using #1000 abrasive grains to allow the optically polished surface to be perceived easily, was produced. The specimen was held for two hours at the Tg (glass-transition point)±5° C. and heat-treated at a rate of temperature decrease of 10° C./hour to remove the residual stress in the processed glass specimen. Thereafter, the Vickers hardness was measured using the Vickers hardness tester VMT-7S manufactured by Matsuzawa Co., Ltd. in accordance with the JIS Z 2244 Vickers hardness testing method.

For measurement, a four-sided pyramid indenter with an angle between the opposite faces of 136° was pressed onto the optically polished surface of the specimen at a load F (2.942 N in the present invention) to make a dent in the surface, the lengths of the two diagonal lines of the permanent dent were measured, and then the average length L (mm) was calculated to obtain the Vickers hardness from the Expression below.

Vickers hardness $HV = 0.1891 \times (F/L^2)$    Expression (4)

Furthermore, the Knoop hardness number of a measuring specimen that was processed into the same shape and annealed in the same way to remove the residual stress was measured using the hardness testing instrument MVK-EII manufactured by AKASHI in accordance with the JIS Z 2251 Knoop hardness number testing method. For Knoop hardness number measurement, a four-sided pyramid diamond indenter, rhombic in cross section, with angles between the two opposite sides of 172°30' and 130° was pressed onto the optically polished surface of the specimen at a load F (0.9807 N in the present invention) for 15 seconds to make a dent, and the larger diagonal line length L (mm) of the permanent dent was measured to calculate the Knoop hardness number from the Expression below.

Knoop hardness number $Hk = 1.451 \times (F/L^2)$    Expression (5)

The Vickers hardness and the Knoop hardness number were measured 20 times each. The mean values are shown in Tables 1 and 2. The maximum and minimum Vickers hardnesses and the maximum and minimum Knoop hardness numbers of the measurements are also shown in Tables 1 and 2.

The components (Si, Al, B, Na, Cu, Sn, F, Cl, Y, La, V, Ta, W, and Nb) of the glasses produced according to Example Nos. 1 to 13 were quantitatively analyzed by Sumika Chemical Analysis Service Ltd. Based on the obtained results, the percentages of Si, Al, B, Na, Cu, Sn, Y, La, V, Ta, W, Nb, F, and Cl in the glass substrate were obtained, assuming that Si, Al, B, Na, Cu, Sn, Y, La, V, Ta, W, and Nb are present in the form of oxides ($SiO_2$, $Al_2O_3$, $B_2O_3$, $Na_2O$, CuO, SnO, $Y_2O_3$, $La_2O_3$, $V_2O_5$, $Ta_2O_5$, $WO_3$, and $Nb_2O_5$) and that F and Cl are present in the form of F and Cl in the glass substrate. The results are shown in Tables 3 and 4. To measure the Cl content, the glass specimen was broken into pieces, which were then dissolved by pyrophosphoric acid and steam-distilled. Then, the Cl content was measured using an ion chromatographic apparatus (ICS-1000 manufactured by Dionex Corporation).

FIG. 6 shows the relationship between the amount of Cl in the glass substrate; and the Vickers hardness and the Knoop hardness number. This figure demonstrates that as the amount of Cl in the glass substrate increases, the Vickers hardness and the Knoop hardness number decrease.

TABLE 3

| | | Example | | | | | | | |
|---|---|---|---|---|---|---|---|---|---|
| | | No. 1 | No. 2 | No. 3 | No. 4 | No. 5 | No. 6 | No. 7 | No. 8 |
| Raw material composition in glass substrate/wt % | $SiO_2$ | 61.17 | 61.14 | 61.13 | 59.94 | 58.79 | 61.16 | 61.21 | 59.97 |
| | $Al_2O_3$ | 8.11 | 8.12 | 8.11 | 7.96 | 7.84 | 8.10 | 8.11 | 7.97 |
| | $B_2O_3$ | 19.30 | 19.28 | 19.26 | 18.92 | 18.60 | 19.29 | 19.27 | 18.91 |
| | $Na_2O$ | 9.76 | 9.74 | 9.75 | 9.58 | 9.41 | 9.74 | 9.72 | 9.58 |
| | $Y_2O_3$ | | | | 1.84 (0.52) | 3.54 (1.01) | | | 1.81 (0.51) |
| | $La_2O_3$ | | | | | | | | |
| | $V_2O_5$ | | | | | | | | |
| | $Ta_2O_5$ | | | | | | | | |
| | $WO_3$ | | | | | | | | |
| | $Nb_2O_5$ | | | | | | | | |
| | CuO | 0.35 | 0.35 | 0.37 | 0.34 | 0.36 | 0.37 | 0.38 | 0.37 |
| | SnO | 0.10 | 0.12 | 0.10 | 0.11 | 0.11 | 0.12 | 0.11 | 0.12 |
| | F | 0.79 | 0.79 | 0.79 | 0.78 | 0.79 | 0.79 | 0.78 | 0.79 |
| | Cl | 0.40 | 0.46 | 0.49 | 0.53 | 0.56 | 0.43 | 0.42 | 0.47 |
| | Total | 100.00 | 100.00 | 100.00 | 100.00 | 100.00 | 100.00 | 100.00 | 100.00 |
| Vickers Hv | Avg. | 420 | 418 | 408 | 405 | 403 | 411 | 415 | 414 |
| | Max. | 427 | 428 | 415 | 413 | 412 | 427 | 423 | 423 |
| | Min. | 413 | 400 | 401 | 398 | 394 | 400 | 409 | 403 |
| Knoop Hk | Avg. | 495 | 482 | 451 | 455 | 459 | 470 | 467 | 463 |
| | Max. | 501 | 493 | 459 | 465 | 468 | 479 | 476 | 464 |
| | Min. | 482 | 472 | 446 | 449 | 450 | 462 | 457 | 441 |
| Near-field extinction ratio*/dB | | 44.0 | 45.5 | 45.7 | 45.9 | 46.1 | 45.1 | 44.8 | 45.5 |
| Shift in polarization axis/° | | 0.150 | 0.135 | 0.129 | 0.121 | 0.108 | 0.136 | 0.142 | 0.131 |

Note:
Values in parentheses in $Y_2O_3$, $La_2O_3$, $V_2O_5$, $Ta_2O_5$, $WO_3$, and $Nb_2O_5$ fields indicate contents in terms of mol %.
Near-field extinction ratios indicate values measured at a measurement distance of 15 mm.

TABLE 4

| | | Example | | | | | Comparative Example | |
|---|---|---|---|---|---|---|---|---|
| | | No. 9 | No. 10 | No. 11 | No. 12 | No. 13 | No. 1 | No. 2 |
| Raw material composition in glass substrate/wt % | $SiO_2$ | 59.43 | 60.23 | 58.82 | 59.92 | 58.79 | 60.92 | 56.43 |
| | $Al_2O_3$ | 7.89 | 7.99 | 7.82 | 7.96 | 7.94 | 8.17 | 10.65 |
| | $B_2O_3$ | 18.70 | 18.99 | 18.58 | 18.91 | 18.87 | 19.40 | 19.14 |
| | $Na_2O$ | 9.50 | 9.62 | 9.40 | 9.58 | 9.55 | 9.94 | 10.99 |
| | $Y_2O_3$ | | | | | | | |
| | $La_2O_3$ | 2.64 (0.52) | | | | | | |
| | $V_2O_5$ | | 1.41 (0.49) | | | | | |
| | $Ta_2O_5$ | | | 3.62 (0.53) | | | | |
| | $WO_3$ | | | | 1.86 (0.51) | | | |
| | $Nb_2O_5$ | | | | | 2.08 (0.50) | | |
| | CuO | 0.37 | 0.35 | 0.36 | 0.38 | 0.35 | 0.37 | 0.79 |
| | SnO | 0.10 | 0.11 | 0.11 | 0.10 | 0.11 | 0.10 | 0.11 |
| | F | 0.79 | 0.78 | 0.79 | 0.78 | 0.79 | 0.76 | 0.75 |
| | Cl | 0.51 | 0.52 | 0.51 | 0.52 | 0.52 | 0.34 | 1.14 |
| | Total | 100.00 | 100.00 | 100.00 | 100.00 | 100.00 | 100.00 | 100.00 |
| Vickers Hv | Avg. | 408 | 410 | 405 | 406 | 408 | 428 | 325 |
| | Max. | 414 | 417 | 416 | 415 | 416 | 439 | 333 |
| | Min. | 402 | 402 | 399 | 400 | 402 | 415 | 318 |
| Knoop Hk | Avg. | 465 | 470 | 465 | 470 | 463 | 504 | 365 |
| | Max. | 472 | 480 | 473 | 478 | 470 | 509 | 372 |
| | Min. | 458 | 463 | 458 | 463 | 455 | 497 | 356 |
| Near-field extinction ratio*/dB | | 45.8 | 45.8 | 45.8 | 45.8 | 45.8 | 40.5 | 37.5 |
| Shift in polarization axis/° | | 0.125 | 0.124 | 0.124 | 0.123 | 0.123 | 0.182 | 0.153 |

Note:
Values in parentheses in $Y_2O_3$, $La_2O_3$, $V_2O_5$, $Ta_2O_5$, $WO_3$, and $Nb_2O_5$ fields indicate contents in terms of mol %.
Near-field extinction ratios indicate values measured at a measurement distance of 15 mm.

Each of the glass blocks according to Example Nos. 1 to 13 was cut into a 120×280×40 mm size and cast into a ceramic mold. Then, the glass pieces were heat-treated for 8 hours at 690° C. to produce a glass containing copper chloride particles in the above-described glass block. This glass was processed to produce a 100×250×4.5 mm (thickness) slab-shaped glass preform with both sides optically polished.

The surface of this glass preform was etched by a thickness of 0.05 to 0.1 mm in an etching liquid containing hydrofluoric acid, and then the glass preform was stretched with a drawing apparatus. Drawing was performed while the drawing temperature (stretching temperature) was being controlled within a range of 660° C. to 680° C. (glass viscosity of 7×106 to 3×106 Pa·S) so that a tensile force of 24.0 to 24.5 MPa was applied, as calculated from the cross-sectional area of the drawn sheet.

The produced drawn sheet was polished to a size of 70 mm in length 0.2 mm in thickness, reduced in a 1-atm hydrogen gas atmosphere at 435° C. for seven hours, and cut into a 15 mm square in a direction parallel with the stretching direction to produce a polarizing glass.

The extinction ratio was measured using an LD light source with a wavelength of 1.55 μm at a distance of 15 mm between the polarizing glass and the power meter serving as a detector in the measuring system shown in FIG. 1. A Glan-Thompson prism with an extinction ratio of 65 dB was used. The diameter of the linearly polarized beam incident upon the polarizing glass was about 1 mm. The power meter used was the "AQ-2125 manufactured by Ando" with a photodetector 5 mm in diameter. The obtained extinction ratios (dB) are shown in Tables 1 and 2. Furthermore, assuming that the angle that gives the minimum amount of transmission light (angle that gives the maximum extinction ratio) at the center point in a 15-mm square region is 0, the angles that give the minimum amounts of transmission light were measured, using an LD light source with a wavelength of 1.55 μm, at eight points including the two points 5 mm away from the center point in a direction orthogonal to the stretching direction, the two points 5 mm away from the center point in the stretching direction, and the four points 5 mm away from the center point in the diagonal directions; the absolute values of angle shifts from the reference angle at the center point were obtained to measure the amounts of shift in the polarization axis; and the maximum of the shifts in the polarization axis at those measurement points was entered in Tables 1 and 2.

FIG. 7 shows the relationship between the amount of Cl in the glass substrate and the near-field extinction ratio (at a measurement distance of 15 mm). This figure shows that the near-field extinction ratio slowly increase as the amount of Cl in the glass substrate increases and starts to decrease after reaching its maximum.

The extinction ratios of the polarizing glasses obtained from the glasses according to Example Nos. 1 and 3 were measured using a 1.55 μm LD light source at measurement distances of 15, 30, 50, 70, 100, 150, 200, 250, and 300 mm in that order. The results are shown in FIG. 5.

In addition, as shown in FIG. 3, a polarizing glass 1 measuring 15 mm square produced from the glass according to Example No. 1; a polarizing glass 2 that was produced by polishing the glass according to Example No. 1 to 70 mm in length by 0.2 mm in thickness and then cutting the reduced sheet into a 15-mm square, at an angle of 45°, to the stretching direction; a commercially available magnetic garnet film 3 (manufactured by Seikoh Giken Co., Ltd.) formed by a liquid phase epitaxy method; and Sm—Co-based magnets 4 were assembled so that the polarization axes of the two polarizing glasses are tilted by 45° and were then bonded with an adhesive. The thickness of each polarizing glass was 0.2 mm, and the thickness of the magnetic garnet film was 0.4 mm. Furthermore, a quartz single mode fiber 5 was attached to the polarizing glass 2 with an adhesive to prototype a pigtail optical isolator for a wavelength of 1.55 μm. The isolation of this pigtail optical isolator for a wavelength of 1.55 μm was 30 dB.

The isolation of the 1.55 μm pigtail optical isolator produced from the glass according to Example No. 3 in the same manner was 32 dB.

Comparative Example No. 1 in a Case where Cu Particles are Contained

A Comparative Example of a glass containing Cu particles will now be described.

A batch of raw materials was prepared to produce the composition according to Comparative Example No. 1 in Table 2 (same as in Example No. 1). Then, a 5-liter platinum crucible was placed in a cubic, front-doored, 800×800×800 mm-capacity melting furnace provided with a 450 mm (vertical)×250 mm (horizontal) opening and two vents 60 mm in diameter at diagonal positions 300 mm away from the stirring rod on the ceiling thereof, and the batch of raw materials was delivered through the front door. The other conditions for producing a glass block were the same as those in Example No. 1.

The Vickers hardness and the Knoop hardness number were measured in the exactly same manner as in Example Nos. 1 to 13 to find the components in the glass substrate by quantitatively analyzing the glass. Furthermore, a polarizing glass was produced in the same manner as in the Examples to measure the near-field extinction ratio and the shift in the polarization axis. The obtained results are shown in Comparative Example No. 1 of Tables 2 and 4.

At this time, the Cl content was measured as 0.34 wt %, which is lower than 0.40 wt % measured in the case of a highly hermetic melting furnace in Example No. 1. As a result of the low Cl content, the Vickers hardness was 428, which is higher than 420 in Example No. 1. Furthermore, the Knoop hardness number was 504, which is higher than 495 in Example No. 1.

The near-field extinction ratio at a measurement distance of 15 mm was measured as 40.5 dB using an LD light source for a wavelength of 1.55 μm. This value is lower than 44.0 dB in Example No. 1. Furthermore, the shift in the polarization axis was measured as 0.182°, which is larger than 0.150° in Example No. 1.

For the above-described polarizing glass produced from the glass serving as a matrix according to Comparative Example No. 1, the extinction ratios were measured in the same manner as in the Examples using a 1.55 μm LD light source at measurement distances of 15, 30, 50, 70, 100, 150, 200, 250, and 300 mm in that order. The results are shown in FIG. 5 together with the results in the Examples.

The extinction ratios of the polarizing glass produced from the glass according to the Comparative Example were below those of the Examples at all measurement distances of 15 mm to 300 mm. The extinction ratio was 56.2 dB at a measurement distance of 300 mm.

A pigtail optical isolator for a wavelength of 1.55 μm was produced in the same manner as in the Examples using two sheets of polarizing glass produced in this manner. The isolation of the pigtail optical isolator for a wavelength of 1.55 μm that used the polarizing glass produced from the glass serving as a matrix according to this Comparative Example was 28 dB.

Comparative Example No. 2 in a Case where Cu Particles are Contained

With an increased amount of replacement from $Na_2O$ to NaCl, a batch of raw materials was prepared so as to achieve the composition according to Comparative Example No. 2 in Table 2 and melted in a 5-liter platinum crucible covered with a platinum lid placed in a cubic, highly hermetic 800×800×800 mm-capacity melting furnace without a front door. The other conditions for producing a glass block were the same as those in Example No. 1 etc.

The Vickers hardness and the Knoop hardness number were measured in the exactly same manner as in Comparative Example No. 1 to find the percentages of the components contained in the glass substrate. Furthermore, polarizing glass was produced in the same manner as in the Examples to measure the near-field extinction ratio and the shift in the polarization axis. The obtained results are shown in Comparative Example No. 2 of Tables 2 and 4.

At this time, the Cl content was measured as 1.14 wt %, which is higher than 0.85 wt %, the upper limit of the amount of Cl according to this embodiment. As a result of the high Cl content, the Vickers hardness was 325, which is smaller than the lower limit 360 of the Vickers hardness, and the Knoop hardness number was 365, which is lower than 400, the lower limit of the Knoop hardness number.

The near-field extinction ratio at a measurement distance of 15 mm was measured as 37.5 dB using an LD light source for a wavelength of 1.55 μm. This value is lower than the target 44.0 dB. In addition, the shift in the polarization axis was measured as 0.153°, which is slightly larger than the target shift of 0.150°.

A pigtail optical isolator for a wavelength of 1.55 μm was produced in the same manner as in the Examples using two sheets of polarizing glass produced in this manner. The isolation of the pigtail optical isolator for a wavelength of 1.55 μm that used the polarizing glass produced from the glass serving as a matrix according to this Comparative Example No. 2 was 24 dB.

Examples in a Case where Ag Particles are Contained

Examples of glasses containing Ag particles will be described.

Glasses with the composition according to Example Nos. 14 to 19 in Table 5 are examples of glasses containing components $Y_2O_3$, $La_2O_3$, $V_2O_5$, $Ta_2O_5$, $WO_3$, and $Nb_2O_5$. Each batch of raw materials was prepared so that the composition according to Example Nos. 14 to 19 in Table 5 was achieved. Raw materials were delivered in nine batches in three hours at 1420° C. into a 5-liter platinum crucible placed in the same melting furnace as used in Example Nos. 1 to 13, that is, a cubic, highly hermetic 800×800×800 mm-capacity melting furnace without a front door or a vent. Subsequently, the raw materials were left at rest for 30 minutes and melted. Thereafter, the temperature was increased to 1490° C., and the raw materials were left at rest for 30 minutes. Then, the raw materials were stirred with a crank-type stirring rod at a rotational speed of 80 rpm for 30 minutes and left at rest for 30 minutes. This was repeated twice. Then, after stirring for a third time for 30 minutes, the raw materials were left at rest for two hours to remove air bubbles in the glass melt, and then the temperature was decreased to 1450° C. in 30 minutes. Then, the raw materials were subjected to finish stirring for 30 minutes at a rotational speed of 50 rpm, poured into a casting mold, and cooled slowly at 520° C. to produce a glass block.

The Vickers hardnesses and the Knoop hardness numbers of the produced glasses according to Example Nos. 14 to 19 were measured in the exactly same manner as in Example No. 1 etc. to find the components in the glass substrate by quantitatively analyzing the glasses. Furthermore, polarizing glass was produced in the same manner as in Example No. 1 etc. to measure the near-field extinction ratios and the shifts in the polarization axes. The obtained results are shown in Example Nos. 14 to 19 of Tables 5 and 6.

The Cl contents of the glasses according to Example Nos. 14 to 19 to which $Y_2O_3$ and other components were added were 0.50 to 0.58 wt %. It is known that as a result of $Y_2O_3$ and other components being added, the amounts of Cl contained in the glasses increased, compared with Comparative Example No. 3 described below.

As the Cl contents increased, the Vickers hardnesses decreased from 428 to 412 through 416, like the polarizing glass containing Cu particles. Furthermore, like the Vickers hardnesses, the Knoop hardness numbers decreased from 502 to 465 through 470.

In addition, the near-field extinction ratios measured at a measurement distance of 15 mm using an LD light source for a wavelength of 1.55 μm were 45.2 to 45.7 dB.

TABLE 5

|  |  | Example | | | | | | Comparative Example |
|---|---|---|---|---|---|---|---|---|
|  |  | No. 14 | No. 15 | No. 16 | No. 17 | No. 18 | No. 19 | No. 3 |
| Raw material composition in glass substrate/ wt % | $SiO_2$ | 56.56 | 56.19 | 56.75 | 55.68 | 56.54 | 56.43 | 57.56 |
| | $Al_2O_3$ | 1.70 | 1.69 | 1.71 | 1.67 | 1.70 | 1.70 | 1.73 |
| | $B_2O_3$ | 18.71 | 18.52 | 18.73 | 18.40 | 18.69 | 18.63 | 19.01 |
| | $Li_2O$ | 1.84 | 1.83 | 1.85 | 1.81 | 1.84 | 1.83 | 1.87 |
| | KCl | 0.87 | 0.86 | 0.87 | 0.85 | 0.87 | 0.87 | 0.89 |
| | $K_2O$ | 7.80 | 7.73 | 7.83 | 7.67 | 7.80 | 7.78 | 7.90 |
| | BaO | 3.21 | 3.19 | 3.23 | 3.16 | 3.20 | 3.19 | 3.26 |
| | $TiO_2$ | 1.55 | 1.54 | 1.56 | 1.53 | 1.55 | 1.55 | 1.58 |
| | $ZrO_2$ | 5.62 | 5.59 | 5.64 | 5.55 | 5.62 | 5.60 | 5.71 |
| | $Y_2O_3$ | 1.65 (0.49) | | | | | | |
| | $La_2O_3$ | | 2.37 (0.50) | | | | | |
| | $V_2O_5$ | | | 1.34 (0.50) | | | | |

TABLE 5-continued

|  |  | Example | | | | | | Comparative Example |
|---|---|---|---|---|---|---|---|---|
|  |  | No. 14 | No. 15 | No. 16 | No. 17 | No. 18 | No. 19 | No. 3 |
|  | $Ta_2O_5$ |  |  |  | 3.19 (0.50) |  |  |  |
|  | $WO_3$ |  |  |  |  | 1.70 (0.50) |  |  |
|  | $Nb_2O_5$ |  |  |  |  |  | 1.94 (0.49) |  |
|  | Subtotal | 100.00 | 100.00 | 100.00 | 100.00 | 100.00 | 100.00 | 100.00 |
|  | AgCl | 0.4823 | 0.4823 | 0.4823 | 0.4823 | 0.4823 | 0.4823 | 0.4823 |
|  | Total | 100.4823 | 100.4823 | 100.4823 | 100.4823 | 100.4823 | 100.4823 | 100.4823 |
| Cl content/wt % |  | 0.58 | 0.56 | 0.50 | 0.54 | 0.52 | 0.53 | 0.32 |
| Vickers Hv | Avg. | 412 | 414 | 415 | 413 | 416 | 414 | 428 |
|  | Max. | 420 | 421 | 422 | 420 | 424 | 420 | 439 |
|  | Min. | 405 | 407 | 407 | 409 | 407 | 406 | 415 |
| Knoop Hk | Avg. | 465 | 467 | 469 | 466 | 470 | 468 | 502 |
|  | Max. | 476 | 477 | 480 | 473 | 479 | 477 | 509 |
|  | Min. | 458 | 459 | 461 | 458 | 462 | 458 | 497 |
| Near-field extinction ratio*/dB |  | 45.7 | 45.5 | 45.3 | 45.5 | 45.2 | 45.3 | 39.6 |
| Shift in polarization axis/° |  | 0.129 | 0.132 | 0.135 | 0.133 | 0.137 | 0.134 | 0.155 |

Note:
Values in parentheses in $Y_2O_3$, $La_2O_3$, $V_2O_5$, $Ta_2O_5$, $WO_3$, and $Nb_2O_5$ fields indicate contents in terms of mol %.
Near-field extinction ratios indicate values measured at a measurement distance of 15 mm.

TABLE 6

|  |  | Example | | | | | | Comparative Example |
|---|---|---|---|---|---|---|---|---|
|  |  | No. 14 | No. 15 | No. 16 | No. 17 | No. 18 | No. 19 | No. 3 |
| Raw material composition in glass substrate/ wt % | $SiO_2$ | 57.67 | 57.27 | 57.97 | 56.75 | 57.72 | 57.56 | 58.87 |
|  | $Al_2O_3$ | 1.67 | 1.66 | 1.68 | 1.64 | 1.67 | 1.67 | 1.70 |
|  | $B_2O_3$ | 17.69 | 17.56 | 17.77 | 17.39 | 17.70 | 17.65 | 18.05 |
|  | $Li_2O$ | 1.77 | 1.76 | 1.78 | 1.74 | 1.77 | 1.76 | 1.81 |
|  | $K_2O$ | 8.05 | 7.99 | 8.09 | 7.92 | 8.06 | 8.04 | 8.22 |
|  | BaO | 3.24 | 3.22 | 3.27 | 3.19 | 3.24 | 3.23 | 3.31 |
|  | $TiO_2$ | 1.57 | 1.56 | 1.58 | 1.55 | 1.57 | 1.57 | 1.60 |
|  | $ZrO_2$ | 5.70 | 5.66 | 5.73 | 5.61 | 5.71 | 5.68 | 5.82 |
|  | $Y_2O_3$ | 1.78 (0.53) |  |  |  |  |  |  |
|  | $La_2O_3$ |  | 2.46 (0.51) |  |  |  |  |  |
|  | $V_2O_5$ |  |  | 1.31 (0.48) |  |  |  |  |
|  | $Ta_2O_5$ |  |  |  | 3.37 (0.52) |  |  |  |
|  | $WO_3$ |  |  |  |  | 1.73 (0.50) |  |  |
|  | $Nb_2O_5$ |  |  |  |  |  | 2.01 (0.51) |  |
|  | Ag | 0.29 | 0.29 | 0.31 | 0.30 | 0.31 | 0.29 | 0.30 |
|  | Cl | 0.58 | 0.56 | 0.50 | 0.54 | 0.52 | 0.53 | 0.32 |
|  | Total | 100.00 | 100.00 | 100.00 | 100.00 | 100.00 | 100.00 | 100.00 |
| Vickers Hv | Avg. | 412 | 414 | 415 | 413 | 416 | 414 | 428 |
|  | Max. | 420 | 421 | 422 | 420 | 424 | 420 | 439 |
|  | Min. | 405 | 407 | 407 | 409 | 407 | 406 | 415 |
| Knoop Hk | Avg. | 465 | 467 | 469 | 466 | 470 | 468 | 502 |
|  | Max. | 476 | 477 | 480 | 473 | 479 | 477 | 509 |
|  | Min. | 458 | 459 | 461 | 458 | 462 | 458 | 497 |
| Near-field extinction ratio*/dB |  | 45.7 | 45.5 | 45.3 | 45.5 | 45.2 | 45.3 | 39.6 |
| Shift in polarization axis/° |  | 0.129 | 0.132 | 0.135 | 0.133 | 0.137 | 0.134 | 0.155 |

Note:
Values in parentheses in $Y_2O_3$, $La_2O_3$, $V_2O_5$, $Ta_2O_5$, $WO_3$, and $Nb_2O_5$ fields indicate contents in terms of mol %.
Near-field extinction ratios indicate values measured at a measurement distance of 15 mm.

Comparative Example in a Case where Ag Particles are Contained

A Comparative Example of a glass containing Ag particles will be described.

A batch of raw materials was prepared so that the composition according to Comparative Example No. 3 in Table 5 was achieved. This glass was produced as a glass block in the same manner as in Example No. 14 etc., except that the melting temperature was 20° C. lower than that of Example Nos. 14 to 19 in all schedules and the slow cooling temperature was 510° C.

The Vickers hardness and the Knoop hardness number were measured in the exactly same manner as in Example No. 14 etc. Furthermore, the glass was quantitatively analyzed to find components contained in the glass substrate. Moreover, a polarizing glass was produced in the same manner as in Example No. 14 etc. to measure the near-field extinction ratio and the shift in the polarization axis. The obtained results are shown in Comparative Example No. 3 of Tables 5 and 6.

At this time, the Cl content was measured as 0.32 wt %, the Vickers hardness was 428, and the Knoop hardness number was 502. The near-field extinction ratio at a measurement distance of 15 mm was measured as 39.6 dB using an LD light source for a wavelength of 1.55 μm, and the shift in the polarization axis was measured as 0.155°.

A pigtail optical isolator for a wavelength of 1.55 μm was produced in the same manner as in Example No. 14 etc. using two plates of polarizing glass produced in this manner. The isolation of the pigtail optical isolator for a wavelength of 1.55 μm that used the polarizing glasses produced from the glass serving as a matrix according to this Comparative Example No. 3 was 26 dB, which is below the specification value of 30 dB.

Comparison Between Examples and Comparative Example in a Case where Ag Particles are Contained The Cl content in the glass according to Comparative Example No. 3 to which $Y_2O_3$ or other components were not added was 0.32 wt %, whereas the Cl contents in the glasses according to Example Nos. 14 to 19 to which $Y_2O_3$ and other components were added were 0.50 to 0.58 wt %. It is known that adding $Y_2O_3$ and other components increased the amount of Cl in the glass.

The extinction ratios in the Examples were higher than 39.6 dB in Comparative Example No. 3 in which $Y_2O_3$ or other components were not added. The shifts in the optical axis were measured as 0.129 to 0.137°, which are smaller than 0.155° in Comparative Example No. 3 and are below the target value 0.150°.

Also in Example Nos. 14 to 19, a pigtail optical isolator for a wavelength of 1.55 μm was produced in the same manner as in Comparative Example No. 3 using two plates of polarizing glass obtained in this manner. The isolations of the pigtail optical isolators for a wavelength of 1.55 μm that used the polarizing glass produced from the glass serving as a matrix according to Example Nos. 14 to 19 were 31 to 32 dB, which are 5 to 6 dB higher than that measured when the glass according to Comparative Example No. 3 in which components were not added was used. Consequently, the pigtail optical isolators according to Example Nos. 14 to 19 had sufficient performance as pigtail optical isolators.

Form the description so far, the following points have been clarified as a result of comparison between the Examples and the Comparative Examples. If the amount of Cl contained in the glass was 0.40 to 0.85 wt %, then a glass with a Vickers hardness of 360 to 420 and a Knoop hardness number of 400 to 495 was produced. In these polarizing glasses produced from the glasses serving as a matrix according to the present invention, the near-field extinction ratios measured at a measurement distance of 15 mm increased to 44 dB or more, and the amounts of shift in the polarization axis at positions 5 mm away from the center were 0.15° or less, demonstrating that a polarizing glass suitable for a pigtail optical isolator was produced.

The present invention can be applied to a polarizer used in, for example, a compact optical isolator for optical communication etc.; an optical switch composed of a liquid crystal, an electro-optic crystal, a Faraday rotator, and so forth; or an electro-magnetic sensor.

What is claimed is:

1. A polarizing glass comprising anisotropically shaped metal particles oriented and dispersed in a glass substrate, wherein
    the glass substrate is a glass selected from the group consisting of silicate glass, borate glass, and borosilicate glass;
    the glass substrate contains at least one component selected from the group consisting of $Y_2O_3$, $La_2O_3$, $V_2O_5$, $Ta_2O_5$, $WO_3$, and $Nb_2O_5$;
    the content of each of the selected components ranges from 0.05 to 4 mole percent, or the total content of the components is 6 mole percent or less if a plurality of components are selected; and
    the Cl content in the glass substrate ranges from 0.47 to 0.58 wt % relative to the entire glass substrate.

2. The polarizing glass according to claim 1, wherein
    the anisotropically shaped metal particles are anisotropically shaped copper particles, and
    raw materials of the glass substrate are composed of, in terms of wt %:
    $SiO_2$: 48-65,
    $B_2O_3$: 13-33,
    $Al_2O_3$: 6-13,
    $AlF_3$: 0-5,
    alkali metal oxide: 7-17,
    alkali metal chloride: 0-5,
    alkali earth metal oxide: 0-5,
    copper oxide and copper halide: 0.3-2.5,
    SnO: 0-0.6, and
    $As_2O_3$: 0-5.

3. The polarizing glass according to claim 1, wherein
    the anisotropically shaped metal particles are anisotropically shaped copper particles, and
    the glass substrate is composed of, in terms of wt % relative to the entire glass substrate:
    $SiO_2$: 55-63,
    $B_2O_3$: 16-22,
    $Al_2O_3$: 7-10,
    alkali metal oxide: 8-12,
    alkali earth metal oxide: 0-3,
    copper oxide: 0.3-1.0,
    SnO: 0-0.3,
    $As_2O_3$: 0-3, and
    F: 0.5-1.0.

4. The polarizing glass according to claim 1; wherein
    an extinction ratio at a measurement distance of 15 mm is 45.2 dB or more in response to at least one of light in a wavelength band with a center wavelength of 1.31 μm and light in a wavelength band with a center wavelength of 1.55 μm.

5. The polarizing glass according to claim 1; wherein
the maximum of the absolute values of the amounts of shift in polarization axis at sites 5 mm away from a center point on a principle surface is 0.137° or less.

6. An optical isolator comprising the polarizing glass according to claim 1.

7. An optical isolator comprising a Faraday rotating element and at least one polarizer, wherein the polarizer includes the polarizing glass according to claim 1.

8. A process of producing a polarizing glass containing anisotropically shaped metal particles oriented and dispersed in a glass substrate by stretching a glass preform, the process comprising:
   melting raw materials of the glass substrate in an airtight melting furnace; and
   replacing at least one of the alkali oxide components in the raw materials of the glass substrate with an alkali chloride component, wherein
   the glass substrate is a glass selected from the group consisting of silicate glass, borate glass, and borosilicate glass;
   the glass substrate contains at least one component selected from the group consisting of $Y_2O_3$, $La_2O_3$, $V_2O_5$, $Ta_2O_5$, $WO_3$, and $Nb_2O_5$;
   the content of each of the selected components ranges from 0.05 to 4 mole percent, or the total content of the components is 6 mole percent or less if a plurality of components are selected; and
   the Cl content in the glass substrate ranges from 0.47 to 0.58 wt % relative to the entire glass substrate.

9. The process of producing a polarizing glass according to claim 8, wherein
   the anisotropically shaped metal particles are copper particles, and
   raw materials of the glass substrate are melted, the raw materials being composed of, in terms of wt %:
   $SiO_2$: 48-65,
   $B_2O_3$: 13-33,
   $Al_2O_3$: 6-13,
   $AlF_3$: 0-5,
   alkali metal oxide: 7-17,
   alkali metal chloride: 0-5,
   alkali earth metal oxide: 0-5,
   copper oxide and copper halide: 0.3-2.5,
   SnO: 0-0.6, and
   $As_2O_3$: 0-5.

\* \* \* \* \*